United States Patent [19]

Hansen

[11] 4,208,065
[45] Jun. 17, 1980

[54] COUPLING GUARD

[75] Inventor: Robert N. Hansen, Avondale, Ariz.

[73] Assignees: Walter C. Avrea, Tempe; Ben Martin, Scottsdale; Thomas Kovacic, Avondale, all of Ariz.; a part interest to each

[21] Appl. No.: 912,401

[22] Filed: Jun. 5, 1978

Related U.S. Application Data

[63] Continuation-in-part of Ser. No. 834,691, Sep. 19, 1977, abandoned.

[51] Int. Cl.² .............................................. B60D 1/06
[52] U.S. Cl. ..................................................... 280/507
[58] Field of Search ............................... 280/507, 511

[56] References Cited

U.S. PATENT DOCUMENTS

| 3,522,958 | 8/1970 | Lusignan | 280/507 |
| 4,032,171 | 6/1977 | Allen et al. | 280/507 |

Primary Examiner—Robert R. Song
Attorney, Agent, or Firm—Don J. Flickinger

[57] ABSTRACT

A base is secured to a mounting member extending from a towing vehicle and having an upstanding ball element. A retention member carried by the base is selectively movable to a position over a socket element which extends from a towed vehicle and which is detachably engaged downwardly over the ball element. The retention member limits the upward travel of the socket element and maintains engagement of the coupling. The retention member is held in position by lock means. A resilient member is disposed between the base and the retention member to prevent the retention member from rattling against the base.

6 Claims, 19 Drawing Figures

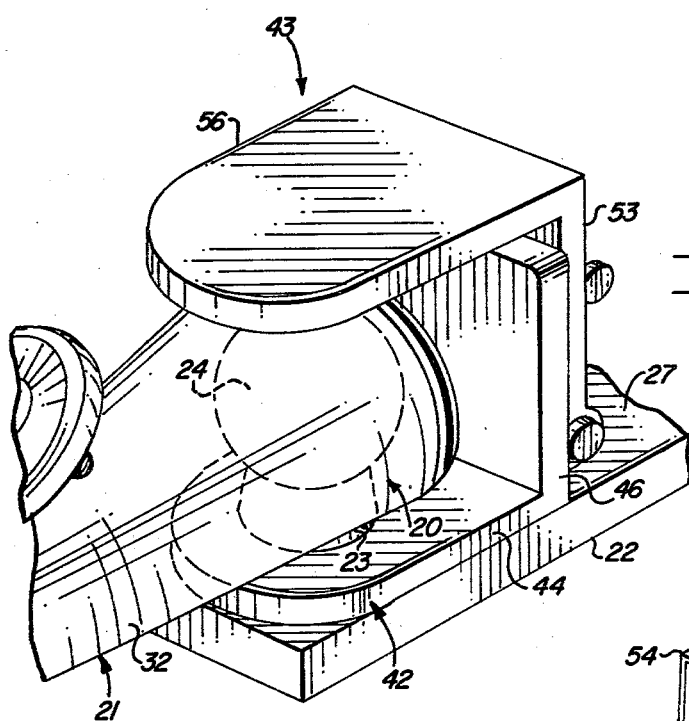
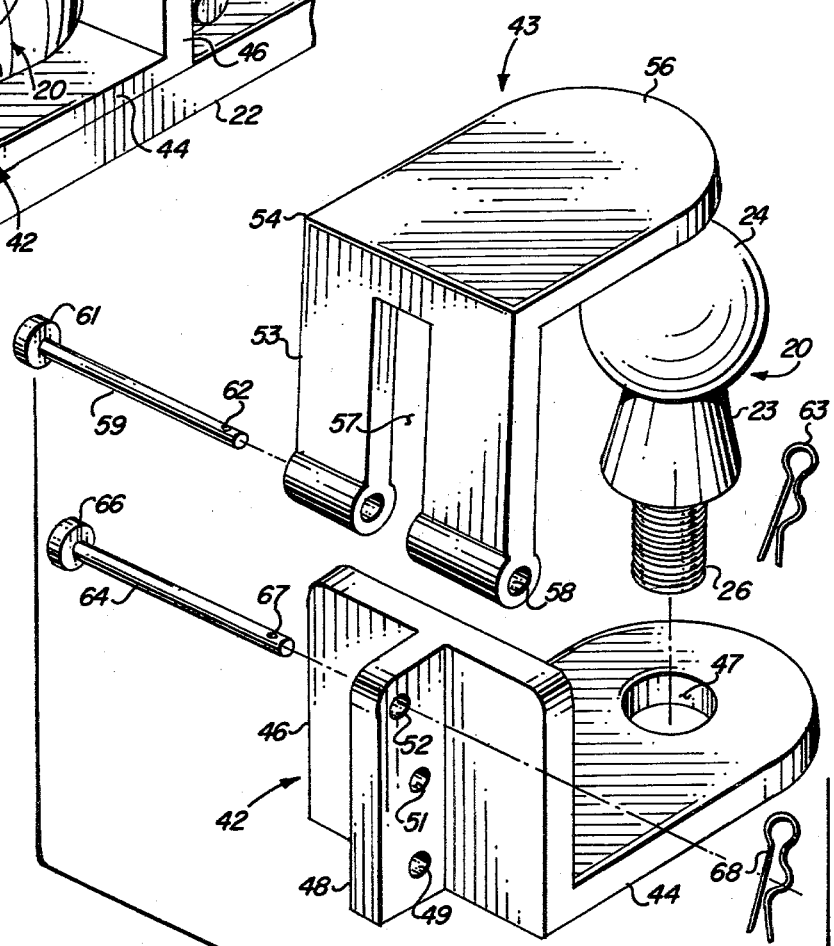
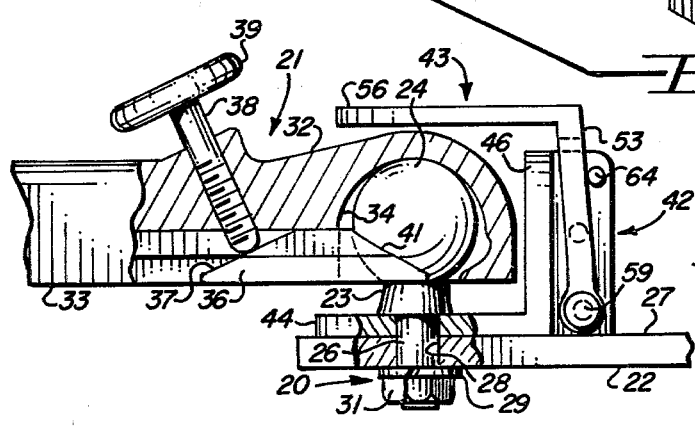

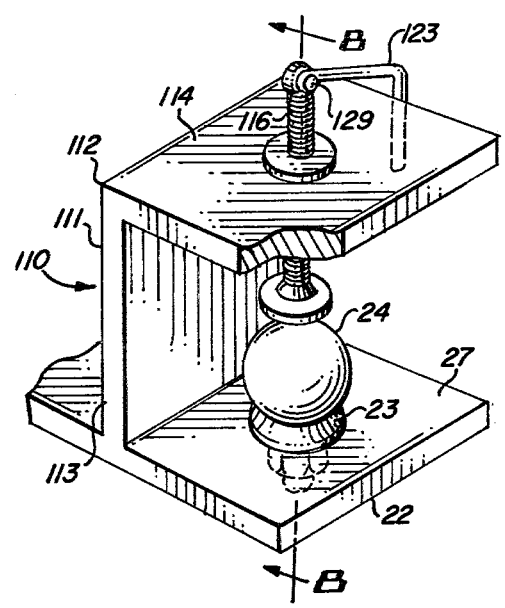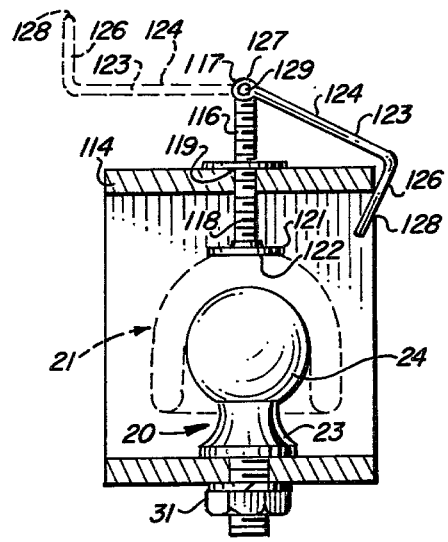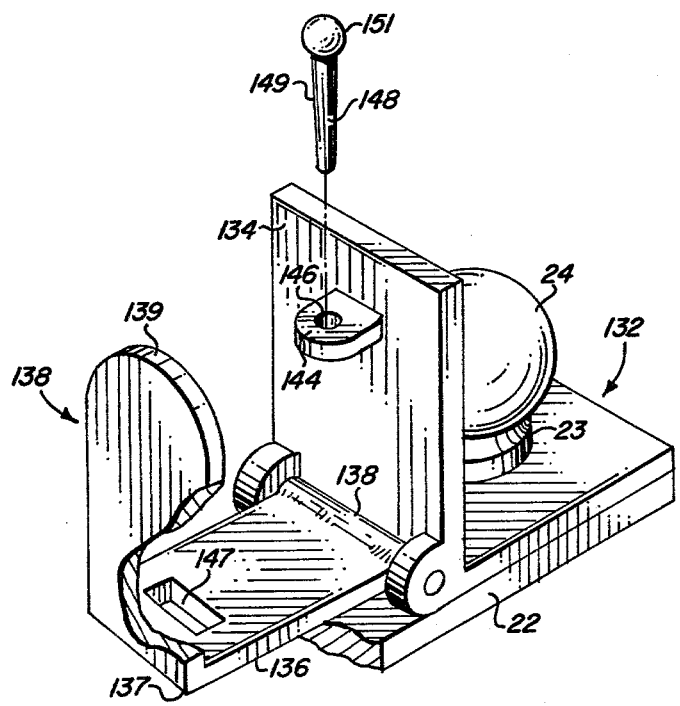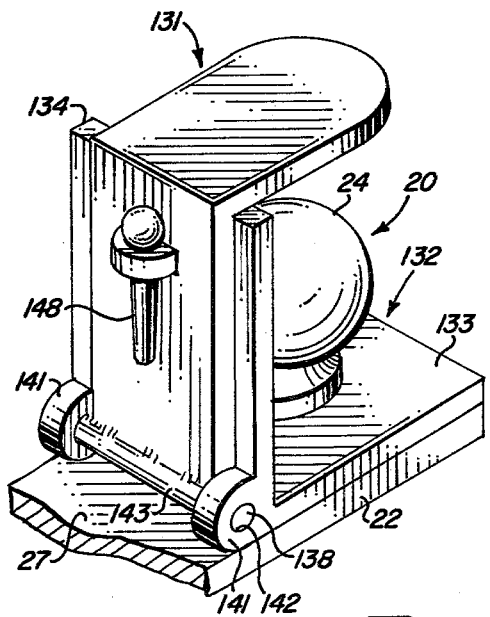

COUPLING GUARD

The instant application is a continuation-in-part application of the common inventor's prior co-pending patent application, Ser. No. 834,691, filed Sept. 19, 1977, entitled COUPLING GUARD now abandoned.

This invention relates to accessories for vehicles.

More particularly the present invention concerns improvements in couplings between a towing vehicle and a towed vehicle.

In a further aspect the instant invention concerns a guard to selectively maintain the coupling in an engaged position.

Motor vehicles such as automobiles and trucks are frequently utilized to pull coaster vehicles such as utility trailers and mobile homes. Couplings for detachably connecting a coaster vehicle, referred to as the towed vehicle, to a powered vehicle, referred to as the towing vehicle, as well know. A familiar and conventional coupling is in the form of a ball and socket arrangement.

Conventionally the towing vehicle is provided with a mounting member, colloquially referred to as a hitch. For light duty towing the mounting member may be permanently or temporarily attached to the rear bumper of the towing vehicle, however in anticipation of heavy-duty service the mounting member is generally braced into the main frame of the towing vehicle. The mounting member is usually a horizontal steel plate which supports an upstanding ball element. The ball element has a depending threaded shank which passes through a hole in the mounting member and is fixed by a lock washer and nut.

Conventionally, the towed vehicle has a forwardly extending tongue which may represent an extension of the frame or may represent an appendage secured to the front of the vehicle. Tongues are usually either rigid with the vehicle or alternately rotatably movable about a horizontal axis in close proximity to the vehicle. A socket element, detachably engageable with the ball element, is carried at the free end of the tongue. For engagement the socket element is lowered downwardly over the ball element and correspondingly the socket element is displaced upwardly for disengagement.

The coupling, as affected by the ball and socket arrangement, is normally retained in engagement by a mechanism associated with the socket element. The mechanism includes a half moon-shaped cleat which is selectively moved under the ball holding the ball captive within the socket. Various arrangements including screw clamps, toggle levers and wedge actuations for moving the cleat are well known in the art.

It is well recognized that the cleat is the weakest and most insecure part of the coupling. During towing, the coupling is subject to exceedingly strenuous forces involving both horizontal and vertical loading. Frequently the vertical loading is in a negative direction and attempts to disengage the coupling. One type of vertical loading frequently encountered is in a negative direction tending to disengage the coupling. During this time the cleat is forced against the underside of the ball, often with a quick impact, and forced to assume responsibility for the coupling. The cleat by nature, is inherently weak, being relatively thin and engaging only a portion of the ball. Accordingly, as a matter of highway safety most motor vehicle codes require the use of additional safety chains extending between the towing vehicle and the towed vehicle.

Most motor vehicle operators are opposed to the use of safety chains. It is generally considered that in the event of a coupling separation the uncontrolled movement of the towing vehicle secured to the towed vehicle only by the flexible chains will have a whip-like effect upon the towing vehicle rendering it uncontrollable and resulting in an accident with envisioned physical injuries or possibly death to the operator. Therefore, many operators have become very astute at weakening the safety chains and cleverly disguising the results in order to pass visual inspection.

In addition to the foregoing, other inherent difficulty reside within the conventional ball and socket coupling arrangement. Particularly with the wedge actuated cleat, it is entirely possible for an operator to manipulate the adjusting screw without effecting a satisfactory engagement. Due to rust, dirt, corrosion or other factors the wedge is prohibited from moving freely. Resultingly the adjusting screw is turned until tight without engaging the cleat under the ball but conveying a false sense of accomplishment to the operator. A similar effect can be created with the screw clamp type socket. Other mechanical problems can also occur as the result of operator inattention. Exemplary is loosening the ball element retaining nut due to constant stress and vibration.

It would be highly advantageous therefore, to remedy the foregoing and other deficiencies and inherent limitations associated with the prior art.

Accordingly, it is an object of the present invention to provide a guard for use in combination with couplings of the type having a ball element and a socket element.

Another object of the invention is the provision of a guard which is securable to the mounting member of pre-existing commercially available couplings.

Still another object of the present invention is to provide a guard which is selectively movable between an engagement retention position and an engagement release position.

Yet another object of the invention is the provision of a guard which will retain the socket element in engagement with the ball element in the event of failure of the coupling.

Still another object of the invention is the provision of a guard which will accommodate various styles and sizes of couplings.

Yet still another object of this invention is to provide a guard which is quickly and conveniently movable between the retention position and the release position.

A further object of the invention is the provision of a guard having locking means for selectively holding the device in the retention position.

And a further object of the invention is to provide a guard which is subject to visual inspection to determine the condition thereof.

Still a further object of the invention is the provision of a guard which will eliminate the need for other and often less effective and potentially dangerous safety devices.

Yet another object of the invention is to provide a guard for maintaining stability of the towing vehicle in the event of coupling failure.

Yet still another object of the instant invention is the provision of a guard which can be attached and used without special tools or skills.

And still another object of the instant invention is to provide a coupling guard of the above type which is substantially maintenance free and relatively economical to manufacture.

And yet a further object of the invention is the provision of a coupling guard in accordance with the foregoing incorporating means to prevent one element thereof from rattling or resounding against another element thereof.

Briefly, to achieve the desired objectives of the present invention in accordance with a preferred embodiment thereof, first provided is a base which is securable to the mounting member extending from the towing vehicle and supporting the upstanding ball element. A retention member, movable between a first position and a second position is carried by the base. In the first position the retention element resides in close proximity over the socket element limiting upward movement thereof and maintaining at least partial engagement with the ball element. In the second position is remote and the socket element is separable from the ball element. Locking means selectively retain the retention member in the first position.

In accordance with one embodiment of the invention the retention member is in the form of an angular bracket pivotally connected to the base. In the first position one section of the angular bracket is placed over the socket. A pin is releasably engaged with the base to inhibit movement of the angular bracket.

In accordance with an alternate embodiment the angular bracket is rigidly affixed to the mounting member. One section of the bracket extends over the ball element and is spaced at a distance thereabove to receive the socket element for engagement with the ball element. A shaft extends through the section of the angular bracket and is camingly engaged therewith. Movement of the shaft in one direction extends the lower end of the shaft toward the socket while rotation in a counter direction retracts the lower end of the shaft. Locking means are provided to inhibit rotation of the shaft.

The foregoing and further and more specific objects and advantages of the present invention will become readily apparent to those skilled in the art from the following detailed description of preferred embodiments thereof taken in conjunction with the drawings, in which:

FIG. 1 is a partial perspective view of a ball and socket type coupling and having a guard embodying the principles of the instant invention associated therewith;

FIG. 2 is an exploded perspective view of the guard of FIG. 1;

FIG. 3 is an elevation view partly in section corresponding to the view of FIG. 1;

FIG. 7 is a perspective view of another coupling guard constructed in accordance with the teachings of the instant invention;

FIG. 8 is a vertical sectional view taken along the line 8—8 of FIG. 7;

FIG. 9 is a perspective view of another embodiment of the instant invention as it would appear when secured to a mounting member and placed in the engagement release position;

FIG. 10 is a perspective view generally corresponding to the view of FIG. 9 and showing the guard thereof moved to the engagement retention position;

Figure 4:
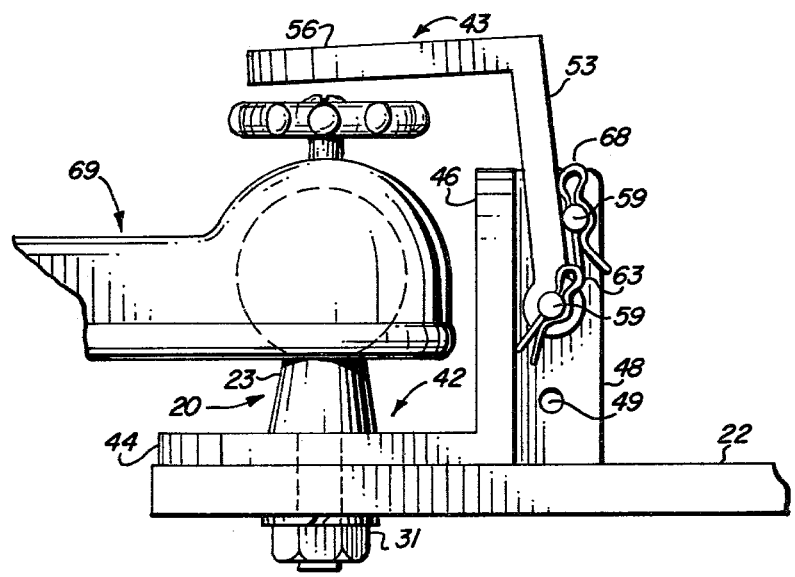
FIG. 4 is a side elevation view of the device of FIG. 2 as it would appear when used in combination with a coupling of a style different than that shown in FIG. 3.

Turning now to the drawings in which like reference characters indicate corresponding elements throughout the several views, attention is first directed to FIGS. 1-3 which show a conventional coupling comprising a ball element generally designated by the reference character 20 and a socket element generally designated by the reference character 21. Ball element 20 is normally carried by a flat plate 22 extending rearwardly from a towing vehicle and comprising a portion of a mounting member. In accordance with conventional practice mounting members take several forms such a lightweight bumper attachments, heavy-duty structures secured directly to the frame of the vehicle and especially constructed bumpers having plate 22 incorporated therein.

Ball element 20 includes base 23 which supports ball 24. Attachment shank 26 depends from base 23 and has a threaded terminal portion. In the normal conventional arrangement base 23 rests upon the upper surface 27 of plate 22. Shank 26 extends through bore 28 in plate 22 and is secured by lock washer 29 and nut 31.

Socket element 21 has a housing 32 which is carried at the free end of a tongue 33 extending from the towed vehicle. In accordance with conventional practice tongue 33 represents an extension of the frame of the towed vehicle or is a separate element attached thereof. An inverted socket 34 is formed in housing 32 and receives ball 24 when socket element 21 is positioned downwardly thereover. An engagement member 36 having rearward beveled edge 37 is slidably carried within housing 32. Screw 38 having hand knob 39 is threadedly engaged through housing 32 and abuts beveled edge 37. Forward edge 41 of engagement member 36 although not here specifically illustrated, is spherically beveled to receive ball 24.

The foregoing description of ball element 20 and socket element 21 are intended to be generally representative of a particular type of coupling. The description thereof is presented only for purposes of reference. Further and more specific details will be readily understood by those skilled in the art. It is of immediate importance, however, that engagement member 36 moves forwardly into contact with ball 24 in response to manual rotation of hand knob 39. As previously noted, corrosion and dirt can retard the movement of engagement member 36. Accordingly, screw 38 can be rotated to a tightened position without moving engagement member 36 and mating forward edge 41 with vall 24. The operator, however, is left with the false impression that the coupling has been properly completed. Further, it will be appreciated that due to the combined bevel and concave curve forward edge 41 is relatively weak in comparison to the other elements of the structure and subject to failure.

A coupling guard constructed in accordance with teachings of the instant invention and including a base 42 and a retention member 43 are also illustrated in FIGS. 1—3. Base 42 includes attachment plate 44 and abutment plate 46 extending upwardly therefrom. Attachment plate 44 has an aperture 47 therethrough which is sized to receive attachment shank 26 of ball element 20 therethrough. The device is secured to a mounting member by first removing nut 31 and removing ball element 20 from plate 22. Attachment plate 44 is aligned with bore 28. Thereafter shank 26 is passed through aperture 47 and bore 28 and secured in the normal manner by nut 31.

Flange 48 extends from abutment plate 46 in a direction away from ball element 20 and toward the towing vehicle. Flange 48 is at the lateral center of abutment plate 46 and extends for the entire height thereof. First, second and third apertures 49, 51 and 52, respectively, extend laterally through flange 48. It is noted that aperture 51 is spaced above aperture 49 than apertures 51 and 49. Further description concerning apertures 49, 51 and 52 will be made presently.

Retention member 43 is in the form of an angular bracket including a first section 53 having upper and lower ends 54 and 56, respectively, and a retention section 56 extending angularly from proximate upper end 54. Support section 53 is bifurcated by slot 57 which slidably receives flange 48. Lower end 56 is enlarged and has an aperture 58 therethrough. Aperture 58 has an internal diameter which is common to apertures 49 and 51.

Retention member 43 is attached to base 42 by attachment pin 59 which has an enlarged head 61 and an aperture 62 which receives retention clip 63. Pin 59 and clip 63 are generally analogous to the commercially available device known as a clevice pin. Pin 59 is receivable through apertures 51, 52 and 58. A locking pin 64 also including enlarged head 66, aperture 67 and retention pin 68 is receivable through aperture 52.

Base 42 and retention member 43 are shown in the assembled and locked position, retaining ball element 20 and socket element 22 in engagement in FIG. 3. Flange 48 is received in slot 57 with support section 53 bearing against abutment plate 46. Pin 59 extends through apertures 58 and 51 and is retained by clip 63. Pin 64 extends through aperture 52 retarding movement of retention member 43 relative base 42 holding retention section 56 over the top of housing 32. To separate the coupling pin 64 is removed and retention member 43 pivoted to a position remote from socket element 21 whereafter socket element 21 is removed in the conventional manner.

FIG. 4 illustrates an alternate socket element 69 in which the adjusting screw terminates with a hand knob 70 extending upwardly from immediately above the socket. Alternate socket element 69 is of a well-known commercially available type. To accommodate the additional height thereof retention member 43 is elevated by extending pin 59 through aperture 51 instead of aperture 49. In other aspects the function remains analogous.

Figure 5:
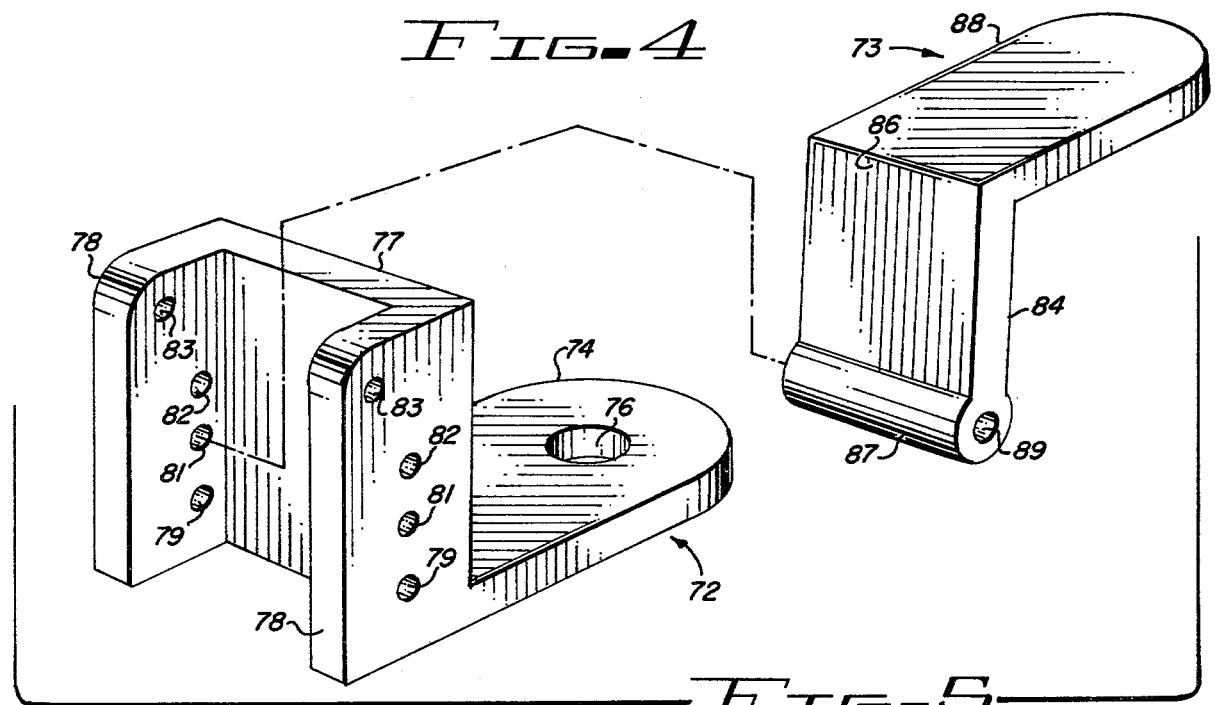
FIG. 5 is an exploded perspective view of an alternate coupling guard constructed in accordance with the teachings of the instant invention.

FIG. 5 illustrates an alternate coupling guard including base 72 and retention member 73 embodying the principles of the instant invention. Base 72 has an attachment plate 74 with aperture 76 therethrough for attachment to plate 22 of the mounting member as previously described. Abutment plate 77 extends upwardly from attachment plate 74 and carries a pair of spaced apart flanges 78 each generally similar to the previously described flange 48. Aligned pairs of apertures 79, 81, 82 and 83 extend through flanges 78. Apertures 79, 81 and 83 are generally analogous to apertures 49, 51 and 52 as hereinbefore described. Apertures 82 are spaced above apertures 81 and provide for additional height of retention member 73.

Retention member 73 includes support section 84 having upper end 86 and enlarged, lower end 87. Retention section 88 extends from proximate upper end 86 of support section 84. Lower end 87 is enlarged and has aperture 89 extending therethrough. Retention member 73 is detachably secured to base 72 by pin 59 and clip 63 as previously described. Pin 64 is received through apertures 83 for positionally locking retention member 73. The use and operation of the embodiment illustrated in FIG. 5 is the same as the previously described embodiment.

Figure 6:
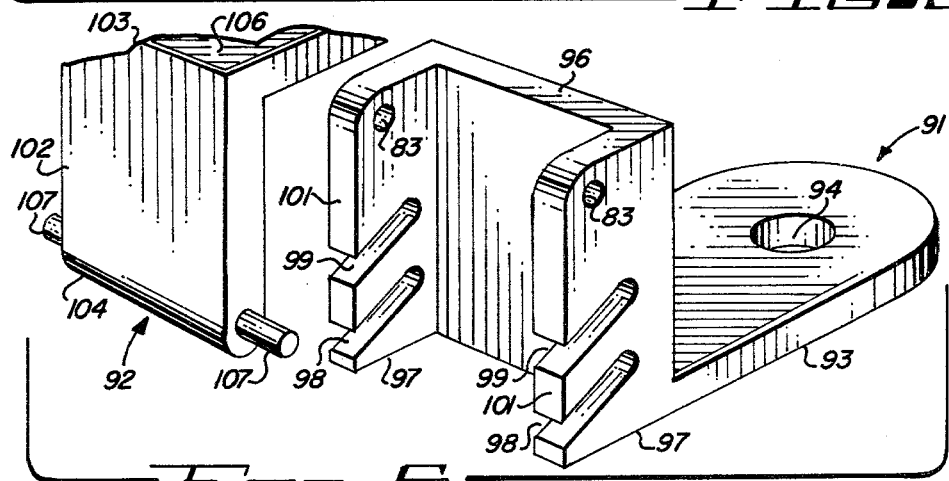
FIG. 6 is an exploded perspective view partly broken of an alternate embodiment of the instant invention.

Attention is now directed to FIG. 6 which shows another embodiment of a coupling guard according to the instant invention having a base 91 and a detachably engageable retention member 92. Generally similar to the corresponding device of FIG. 5, base 91 has an attachment plate 93 which is received on the upper surface 27 of plate 22. Aperture 94 through plate 93 accommodates attachment shank 26. Abutment plate 96 extends upwardly from attachment plate 93 and has a pair of spaced flanges 97 extending in the direction of the towing vehicle. Locking pin receiving apertures 83 extend in aligned arrangement through flanges 97. First and second pairs of aligned slots 98 and 99 are also carried by flanges 97. Each slot 98 and 99 opens at the free edge 101 of flange 98 and extends therefrom upwardly terminating proximate abutment plate 96.

Retention member 92 includes support section 102 having upper end 103 and lower end 104 with retention section 106 extending angularly from proximate upper end 103. Projections 107 extend outwardly from either lateral edge of support section 102 proximate end 104. Projections 107 are aligned and sized to be received within slots 98 and 99.

The immediate device is functionally analogous to the devices herein previously described. It is inherent within the devices described in connection with FIGS. 1–6 that the respective retention member is removable for storage during occasions when the vehicle is not used as a towing vehicle. Accordingly, the retention member is not subject to accidental loss, theft or rattling against the base. The slope of slots 98 and 99 prevent accidental disengagement of the retention member during periods of use.

FIGS. 7 and 8 illustrate an alternate form of the invention in which the base 110 includes a first section 111 having upper and lower ends 112 and 113. Lower end 113 is permanently affixed to the upper surface 27 of plate 22 and by welding such that first section 111 extends upwardly therefrom. Second section 114 is spaced above ball 24 at a distance to receive socket element 21 between second section 114 and ball 24 for purposes of engagement and disengagement.

The retention member in the immediate embodiment is in the form of an elongate shaft 116 having an upper end 117 and a lower end 118. The shaft 116 extends through aperture 119 in second section 114. The longitudinal axis if shaft 116 and aperture 119 radiates from proximate the diametric center of ball 24. Shaft 116 has an external screw thread which is matingly received within an internal screw thread within aperture 119 such that rotation of shaft 116 in one direction in a counter direction retracts lower end 118. Threaded engagements such as described above are forms of caming means. Accordingly, it will readily occur to those skilled in the art that other types of caming engagement means are usable in connection with the instant invention. Such caming means can be selectively chosen to control the rotation to advancement ratio of stem 116.

Carried at lower end 118 is a foot 121 having an undersurface 122 which abuts the top of socket element 21 to retain the engagement between socket element 21 and ball element 20. A handle 123 having stem section 124 and grip section 126 and first and second ends 127 and 128 is secured to shaft 116. Pivot pin 129 extends screw ends 117 and 127 of shaft 116 and handle 123, respectively, on an axis generally perpendicular to the longitudinal axis of shaft 116. Accordingly, shaft 116 is rotatable by handle 123. Handle 124 also functions as locking means to retard movement of shaft 116 by engagement of grip section 126 with any edge of second section 114 of base 10. The length of stem section 124 is sufficiently short to prevent grip section 126 from moving past a corner of second section 124. It will be appreciated that the corners of section 124 are further from the axis of shaft 116 than are the sides thereof.

FIGS. 9 and 10 illustrate a coupling guard constructed in accordance with the teachings of the present invention in which the retention member 131 is movably but permanently affixed to the base 132. Similar to previously described base 42, base 132 includes an attachment plate 133 which is secured to the upper surface 27 of plate 22 by ball element 20. Abutment plate 134 extends upwardly from attachment plate 133. Retention member 131 in general similarity to retention member 43 includes support section 136 having upper and lower ends 137 and 138, respectively. Retention section 139 extends from upper end 137 and is angularly disposed, preferably at a right angle, to support section 136.

A pair of aligned tabs 141 extend from base 132 and have apertures 142 therein which pivotally receive respective ends of pin 143 carried at the lower end 138 of support section 136. Retention member 131 is pivotally movable between a release position as seen in FIG. 9 and a retention position as seen in FIG. 10.

Ear 144 having aperture 146 therein extends from abutment plate 34 in a direction toward the towing vehicle or away from ball element 20. Slot 147 is formed in support section 136 and receives ear 144 therethrough when retention member 131 is in the retention position. Locking pin 148 is passed through aperture 146 to hold retention member 131 in the retention position. Preferably pin 148 has a tapered shank 149 for increased frictional engagement with aperture 146 as will be appreciated by those skilled in the art. Enlarged head 151 facilitates manual manipulation of pin 148.

Figure 11:
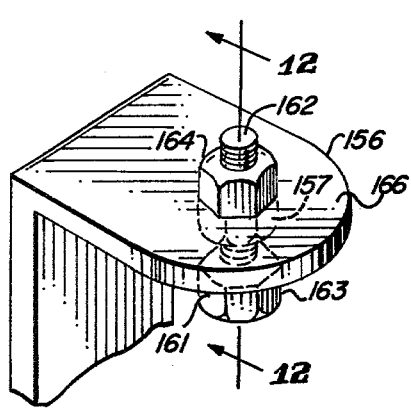
FIG. 11 is a partial perspective view of yet another embodiment of the instant invention.
Figure 12:
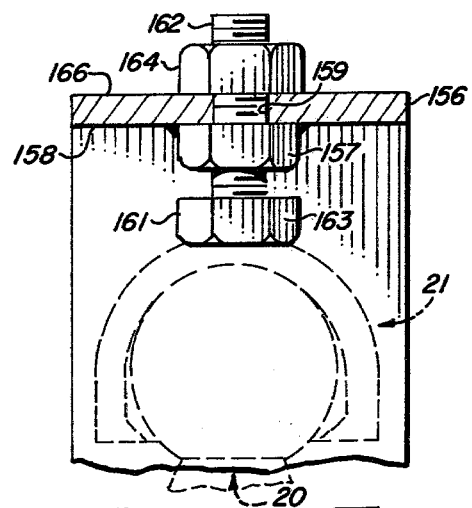
FIG. 12 is a vertical sectional view taken along the line 12—12 of FIG. 11.

FIGS. 11 and 12 illustrate adjustable retention means which is usable in combination with any of the embodiments of the instant invention herein previously described. For reference the adjustable retention means are illustrated as being carried by a plate element 156, the second section 114 of base 10 or the retention section such as typified by retention section 56 of retention member 43. Nut 157 is welded to the undersurface 158 of plate element 156 in alignment with aperture 159 formed therethrough. Bolt 161 having threaded shank 162 and head 163 is threadedly engaged with nut 157 and passes through aperture 159. Head 163 functions as a foot analogous to foot 121 as previously described. Second nut 164 is threadedly engaged with shank 162 and tightens against upper surface 166 of plate element 156 to function as a jamb nut and retard rotation of bolt 161.

From the foregoing description of the device of FIGS. 11 and 12 it will be appreciated that bolt 161 is extendible and retractable in the same way as shaft 116 previously described in connection with FIGS. 7 and 8. Provided with a shank longer than the shank specifically illustrated as shank 162 the immediate arrangement can be used with base 110 in lieu of shaft 116. Alternately the arrangement is usable with other embodiments of the instant invention, especially the embodiment shown in FIGS. 9 and 10, as an adjustable member to accommodate socket elements having varying heights.

Figure 13:
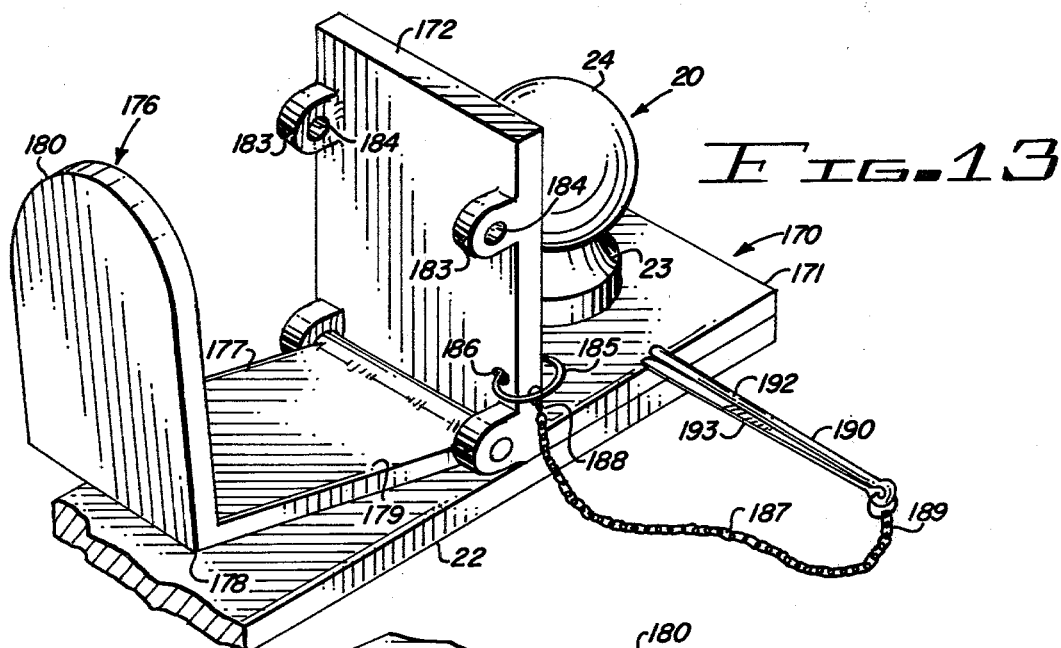
FIG. 13 is a perspective view of still a further coupling guard embodying the teachings of the present invention as it would appear when secured to a mounting member and placed in the engagement release position.
Figure 14:
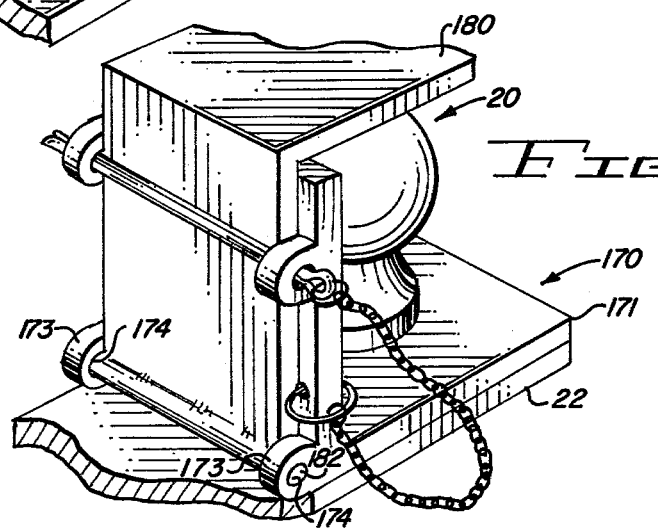
FIG. 14 is a view generally corresponding to the view of FIG. 13 and showing the coupling guard thereof in the engagement retention position.

Shown in FIGS. 13 and 14 is another embodiment of the instant invention directly related to the embodiment illustrated in FIGS. 9 and 10. Provided is a base 170 having an attachment plate and an upstanding abutment plate 172 as previously described. Also as previously described, a pair of tabs 173, having aligned apertures 174 therethrough, extend from abutment plate 172.

Retention member 176 includes support section 177, having upper and lower ends 178 and 179 and retention section 180 extending angularly from upper end 178. Pin 182 is carried at lower end 179 and is pivotally journaled within apertures 174. A pair of ears 183, having aligned apertures 184 extend from abutment plate 172 and are spaced above tabs 173.

A ring 185 is secured to abutment plate 172 by extending through aperture 186. Chain 187 has a first end 188 which is secured to ring 185 and a second end 189 to which is fixed bifurcated spring pin 190. Legs 192 and 193 of spring pin 190 are normally biased in opposing directions. When urged together, the legs 192 and 193 can be passed through apertures 184. Thereafter, pin 190 is frictionally retained within the ears 183.

Figure 15:
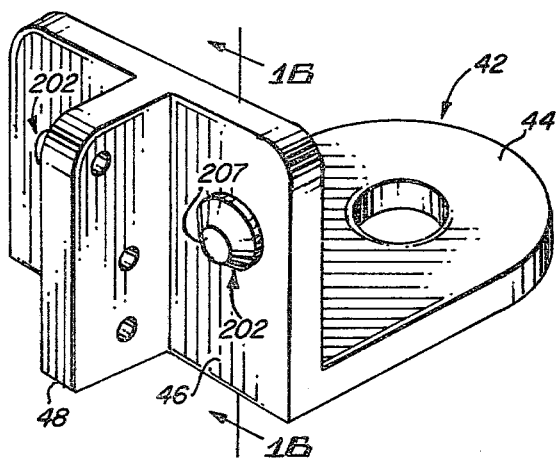
FIG. 15 is a perspective view of a component of the embodiment of FIGS. 1-4, said component being modified to include an anti-rattle and vibration element.
Figure 16:
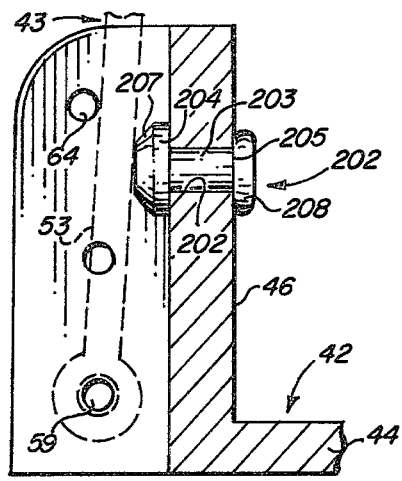
FIG. 16 is a vertical sectional view taken along the line 16—16 of FIG. 15.

FIGS. 15 and 16 illustrate an alternate embodiment of the instant invention which is a modification of the embodiment of the instant invention as previously described in connection with FIGS. 1–4. An aperture 200 is formed through abutment plate 46 of base 42. A bumper element, generally designated by the reference character 202, is carried by base 42. Bumper element 202 includes elongate shank 203 having first end 204 and second end 205 and which is sized and shaped to be received within aperture 200. The length of shank 203 corresponds approximately to the thickness of abutment plate 46. An enlarged resilient head 207 is carried at first end 204 of shank 203 and a retaining element in the form of angular flange 208 is carried at second end 205.

In accordance with the immediate embodiment, bumper element 202 is unitarily fabricated of a resilient material such as rubber or neoprene. During assembly, angular flange 208 is compressed and forced through aperture 200. Subsequently, abutment plate 46 is captive between head 207 and angular flange 208. In accordance with an alternate embodiment, the retaining member may be in the form of a screw threadedly engaged with shank 203 and having a head which functions as angular flange 208.

Two apertures 200 are formed through abutment plate 46, one on either side of flange 48. When retention member 43 is in the first position, for limiting the upward movement of the socket element relative to the ball element as herein previously described, first section 53 abuts head 207. Locking pin 64 holds first section 53 firmly against head 207. Preferably, in accordance with the preferred embodiment of the invention, pressure must be applied to retention member 43 compressing head 207 prior to the insertion of locking pin 64.

The purpose of bumper element 202 is to prevent retention member 43 from rattling and resounding against base 42. Since the coupling guard of the instant invention is preferably metallic and firmly affixed to a vehicle, it will be appreciated that any noise or vibration generated within the coupling guard is transmitted throughout the vehicle and is potentially the source of discomfort and distraction to the operator of the vehicle.

A bumper element, such as bumper element 202 described above, is useful in connection with various embodiments of the coupling guard of the instant invention such as the embodiments illustrated in FIGS. 1-6, 9, 10, 13 and 14. Each of the embodiments commonly include a base having an upstanding abutment plate and a retention member pivotly connected to the base and including a generally upstanding first section. The retention member is selectively movable between a first position for limiting the movement of the socket element relative to the ball element, and a second position wherein the socket element is removable from the ball element. A pin holds the retention member in the first position by limiting the movement of the retention member away from the first position.

Generically, for pusposes of the immediate discussion concerning the bumper element, it can be considered that the base is the first element and that the abutment plate is a stationary member. Similarly, the retention member comprises a second element in which the first section is a movable member. The pin functions as lock means for selectively limiting the movement of the movable member in a direction toward the second position. It will be appreciated by those skilled in the art that due to factors of manufacturing tolerance that the lock means retains the movable member from movement away from the first position but does not hold the movable member solidly. In other words, a degree of movement exists within the first position as apparent from viewing the illustrations of FIGS. 3 and 4.

Figure 17:
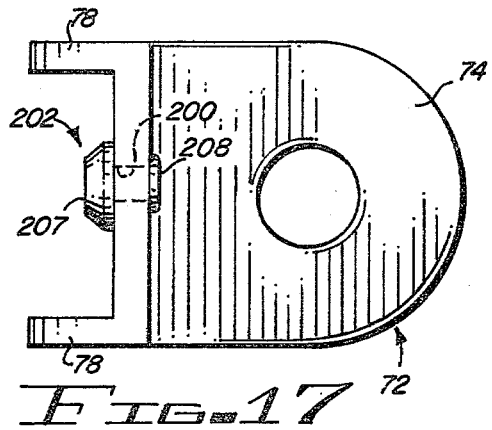
FIG. 17 is a plan view of a component of the embodiment of FIG. 5 and further including an anti-rattle and vibration element.

FIG. 17 illustrates the base 72 (first element) having abutment plate 77 (stationary member) of the embodiment as previously described in connection with FIG. 5. Aperture 200 is formed through abutment plate 77 intermediate flanges 88 and has bumper member 202 held herein.

Figure 18:
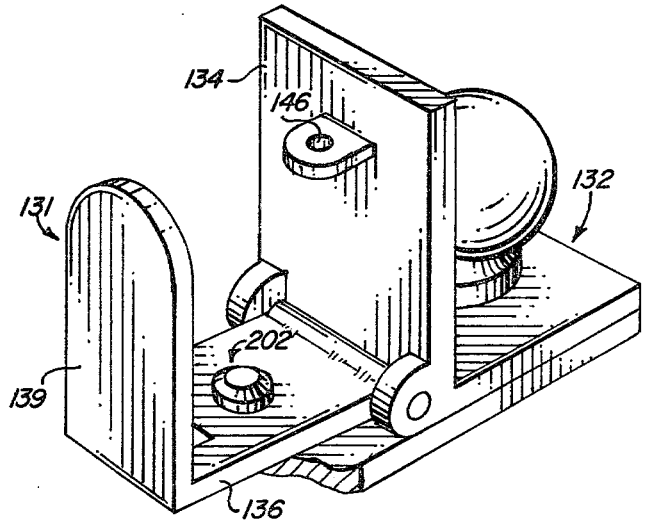
FIG. 18 is a perspective view generally corresponding to the view of FIG. 9 and further including an anti-rattle and vibration element.
Figure 19:
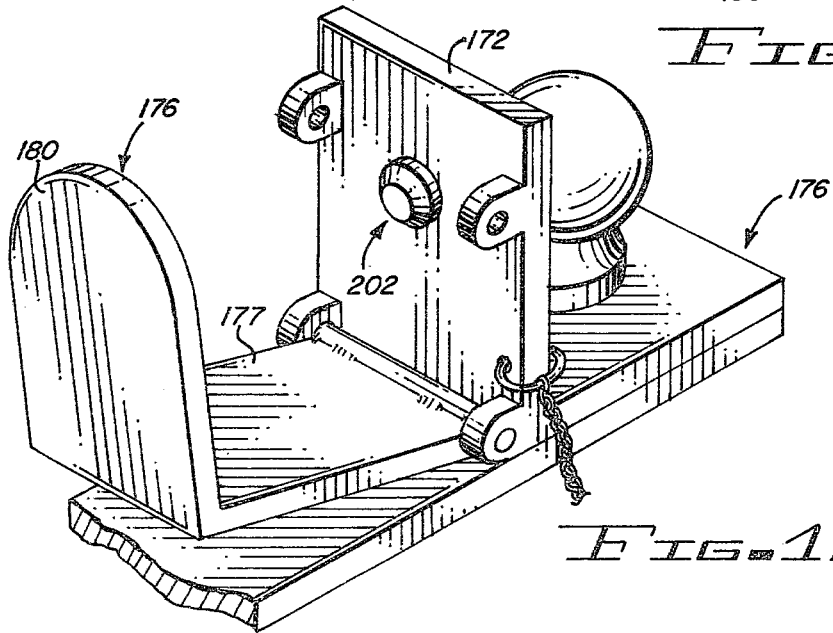
FIG. 19 is a perspective view generally corresponding to the view of FIG. 13, the embodiment thereof being modified to include an anti-rattle and vibration element in accordance with the teachings of the instant invention.

FIGS. 18 and 19 show bumper element 202 attached as previously described to the embodiments of the coupling guard as previously described in connection with FIGS. 13 and 14, respectively. Support sections 136 and 177 are considered to be the movable members. In FIG. 19 bumper element 202 is secured to the stationary element as previously described. Member element 202, as seen in FIG. 18, is attached to the movable member. The function of bumper element 202 is the same whether attached to the movable member or the stationary member. Accordingly, bumper element 202 may be attached to either element in any of the embodiments presented.

Various changes in the embodiments of the instant invention herein chosen for purposes of illustration will readily occur to those skilled in the art. For example, the various locking and attachment devices, such as those designated by the references characters 59, 64, 148 and 190, can be replaced by other functionally equivalent devices such as a nut and bolt. Further control over separation of the towed vehicle from the towing vehicle can be exercised by replacing the retention member, such as typified by pin 148, with a conventional padlock which is readily received through the appropriate aperture provided in several of the described embodiment. It is also contemplated that the elements shown in a specific embodiment are readily combinable or replacable with elements within another illustrated embodiment. To the extent that such modifications and variations do not depart from the spirit of the invention, they are to be included within the scope thereof which is limited only by a fair interpretation of the appended claims.

Having fully described and disclosed the instant invention and alternately preferred embodiments thereof in such clear and concise terms as to enable those skilled in the art to understand and practice the same, the invention claimed is:

1. A guard for use in combination with a coupling for detachably securing a towed vehicle to a towing vehicle, said coupling including, an upstanding ball element having a depending attachment shank received through a bore in a mounting member extending rearwardly from said towing vehicle, and an inverted socket element carried at the free end of a tongue extending forwardly from said towed vehicle, said socket element being detachably engaged downwardly over said ball element, and for selectively limiting the upward movement of said socket element relative said ball element, said guard comprising:

a. a base securable to said mounting member;
  b. retention means in the form of an angular bracket including,
    i. an upright support section carried on the side of said base opposite said ball element, and
    ii. a retention section extending angularly from proximate the upper end of said support section and extending over said base and said ball element; and
  c. attachment means for pivotally securing said support section proximate the lower end thereof to said base, said retention means being movable between a first position in which said retention section extends over said ball and a second position in which said retention section is remote from said ball.

2. The guard of claim 1, further including locking means for selectively retaining said angular bracket in said first position.

3. The guard of claim 2, wherein said locking means includes an ear carried by said base and having an aperture therethrough for receiving a retention member,
said retention member interfering with movement of said angular bracket from said first position to said second position.

4. The guard of claim 1, wherein said attachment means includes a pin carried proximate the lower end of said support section and rotatably journaled within said base.

5. The guard of claim 1, wherein said attachment means includes:
 a. an aperture extending through said support section;
 b. a corresponding aperture extending through said base; and
 c. a pin extendable through said aperture and said corresponding aperture.

6. The guard of claim 5, further including a second corresponding aperture through said base and spaced above said first mentioned corresponding aperture.

* * * * *